United States Patent [19]

Keoteklian

[11] 4,173,532
[45] Nov. 6, 1979

[54] METHOD FOR TREATING PLANT EFFLUENT

[75] Inventor: Hagop Keoteklian, Islip, N.Y.

[73] Assignee: Entenmann's, Inc., Bay Shore, N.Y.

[21] Appl. No.: 801,375

[22] Filed: May 27, 1977

Related U.S. Application Data

[63] Continuation-in-part of Ser. No. 662,286, Feb. 27, 1976, abandoned, which is a continuation of Ser. No. 449,003, Mar. 7, 1974, abandoned.

[51] Int. Cl.² ............................................. C02B 1/20
[52] U.S. Cl. ..................................... 210/49; 210/51; 210/53
[58] Field of Search ............................. 210/51–53, 210/49, 50, 62, 54

[56] References Cited

U.S. PATENT DOCUMENTS

| | | | |
|---|---|---|---|
| 2,444,774 | 7/1948 | Hay | 210/51 |
| 3,171,804 | 3/1965 | Rice | 210/53 |
| 3,377,274 | 4/1968 | Burke et al. | 210/53 |
| 3,423,309 | 1/1969 | Albertson | 210/53 |
| 3,673,083 | 6/1972 | Sawyer et al. | 210/53 |
| 3,846,293 | 11/1974 | Campbell | 210/53 |

Primary Examiner—Thomas G. Wyse
Attorney, Agent, or Firm—Kenyon & Kenyon

[57] ABSTRACT

A method for the removal of dissolved and/or suspended solid wastes from the liquid effluent of an industrial plant subsequent a stepwise formation of flocs and precipitates with subsequent removal of same utilizing coagulating and flocculating agents while simultaneously adjusting the pH of the treatment medium. Both ferric chloride, lime and aluminum sulfate are used as primary flocculants with their action enhanced by the use of suitable polyelectrolytes. A coagulant for starches and fats facilitate more complete precipitation of wastes. Means for carrying out the method include at least one clarifier with a special arrangement of baffles to enhance the formation of the flocs and precipitates. In a preferred mode of operation, liquid industrial effluent is first pre-treated with a cationic coagulant and cationic polyelectrolyte prior to the stepwise floc formation and pH adjustments.

15 Claims, 6 Drawing Figures

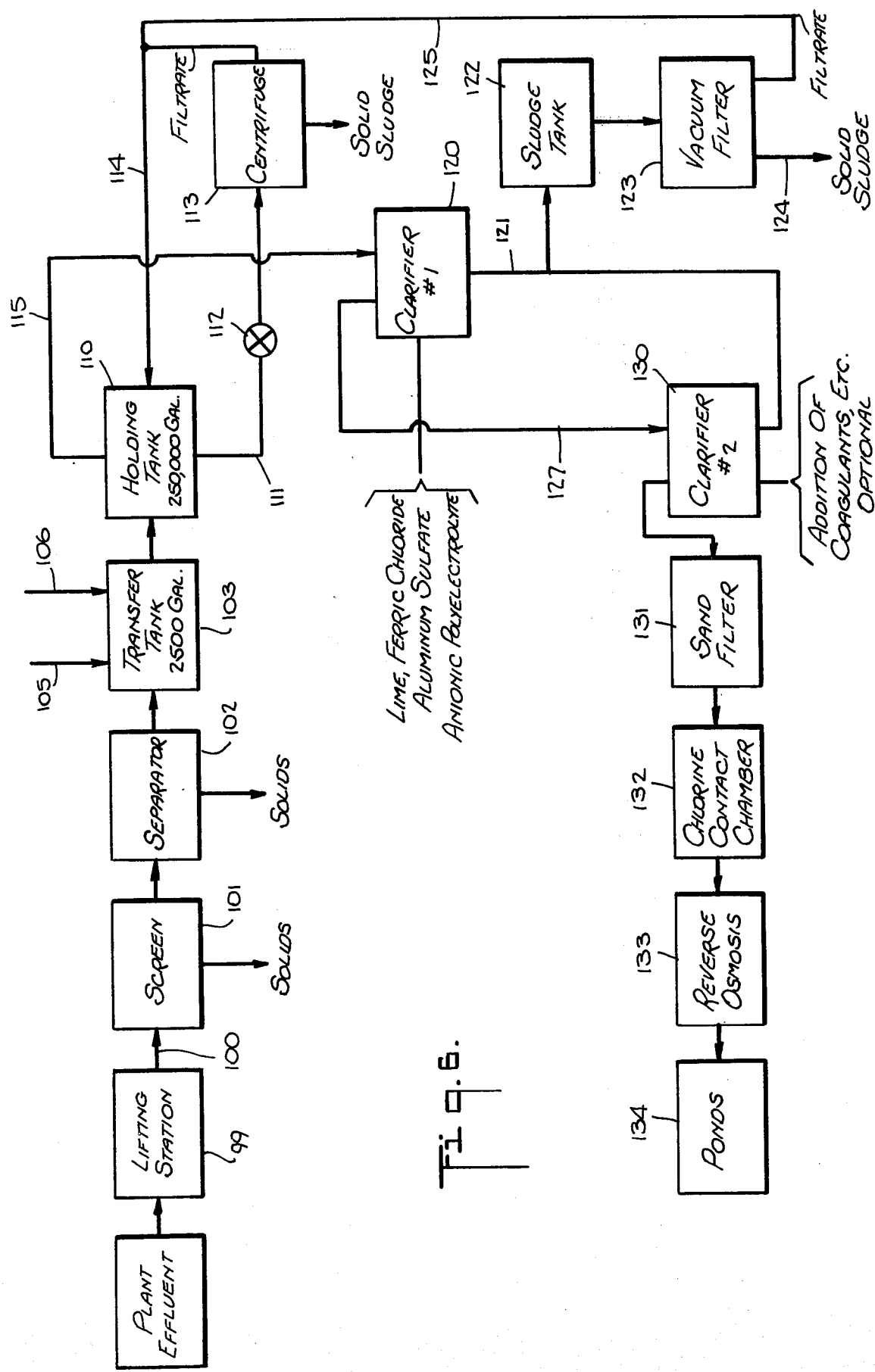

METHOD FOR TREATING PLANT EFFLUENT

BACKGROUND OF THE INVENTION

This application is a continuation-in-part of application Ser. No. 662,286, filed Feb. 27, 1976, abandoned, which in turn, is a continuation of application Ser. No. 449,003, filed Mar. 7, 1974, abandoned.

This invention relates to waste treatment and more particularly to the removal of solid waste materials, having a high biochemical oxygen demand (BOD) and/or chemical oxygen demand (COD), from the liquid effluent of an industrial plant. These waste materials generally contain varying amounts of organic and inorganic by products from the particular processes being performed in the industrial plant and contain little or no sanitary waste materials. The invention includes a unique process utilizing the addition of chemical agents to effect sludge removal. It also includes a novel polyelectrolyte material for utilization in said process. It further includes means to carry out the process. The process and materials of this invention have been found to be particularly effective in removing wastes from the effluent of a cake baking plant.

In one type of industrial plant the waste material consists primarily of a single type of material, which can often be removed in a specific manner, as for example, that disclosed in U.S. Pat. No. 2,433,458, to Kahn et al, issued Dec. 30, 1947, for a method of treating pickle liquor used in the acid pickling of steel. In many other types of industrial plants the waste effluents contain varying amounts and forms of waste material. In such cases, it is often difficult to provide an efficient and economical process to remove these variable waste materials. The method of the invention is uniquely suitable to removing widely differing amounts and forms of waste material from the effluent of industrial plants. It has proven effective in treating bakery effluent, cesspool residue, restaurant wash water, commercial laundry water, water from used paper reclamation, and black liquor from a pulp mill.

Prior to this invention, it had not been possible to remove successfully, in particular, the wastes from the effluent of a cake baking plant, which effluent contains widely varying quantities of sugar, starch, flavorings, wash waters and various particulates.

While the method of the invention is primarily directed to the separating of waste materials from the water in the effluent of an industrial plant, it is also useful for the treatment of sanitary wastes. Generally it has been found to remove about 95% of the sanitary waste material from liquid sewage threby reducing the size of the subsequent biological treatment plant.

Problems have arisen when the waste material to be treated contains a very high biochemical oxygen demand (BOD) and/or very high chemical oxygen demand (COD). If this demand is not significantly lowered, the lagoons, lakes, rivers, etc., into which the effluent is eventually deposited, will become devoid of dissolved oxygen. This may produce septic conditions accompanied by foul odors, death of natural fauna, and a buildup of scum of the surface of the water.

It is not generally feasible to attempt to oxidize these materials since the expense of oxidizing agents would be very great. Hence, these materials must be removed from the effluent prior to discharge into the earth or into a body of surface water. The method of this invention is directed to removing a high percentage of oxidizable wastes from said waste liquor, thereby rendering the effluent sufficiently pure to be discharged into lagoons, rivers, lakes, municipal sewerage systems, or ground water.

Numerous treatment processes have been designed for removing industrial wastes, however, most of these have been unable to treat successfully waste liquors having a high concentration of dissolved solids and/or a large quantity of suspended solids without first greatly diluting the waste liquor with large quantities of fresh water. This not only increases the already strained demand for water, but necessitates use of a treatment plant of unduly large capacity.

Since the Environmental Protection Administration now limits the total quantity of solids, either dissolved or suspended, which may be discharged per day, a mere dilution technique is not permissible. The method of this invention eliminates these problems and provides for economical and efficient treatment of industrial waste liquors.

Prior to the process of this invention it has not been possible to successfully remove large quantities of dissolved and suspended matter from waste waters. Generally, efforts in this regard have been directed to the purification of drinking water, which involves the removal of quite small amounts of undesirable materials. See, for example, U.S. Pat. No. 677,668, to Koyl, issued July 2, 1901; U.S. Pat. No. 2,152,942, to Wilson, issued Apr. 4, 1939; U.S. Pat. No. 3,203,894, to Ikuno, issued Aug. 31, 1965.

While certain reactants utilized in the process of this invention have been utilized in prior water purification processes, as in the above-enumerated patents, and, for example, in U.S. Pat. No. 2,350,111, to Hood, issued May 30, 1944, U.S. Pat. No. 3,276,998, to Green, issued Oct. 4, 1966, U.S. Pat. No. 3,423,309, to Albertson, issued Jan. 21, 1969, and U.S. Pat. No. 3,846,293, to Campbell, issued Nov. 5, 1974, none of the prior processes have utilized these reactants in the manner of the invention which enables large quantities of waste material to be removed.

The apparatus of the invention includes at least one clarifier unit generally in the form of an open tank or reservoir in which unique baffle arrangements and a rotary impeller cause predetermined flow conditions for enhancing the forming of flocs and precipitates. Clarification apparatus in the form of a tank or reservoir with baffles and an impeller is shown in the Kahn et al patent, supra, and in U.S. Pat. No. 3,238,128, to Gustafson, issued Mar. 1, 1966. Other clarification apparatus in this form is sold by the Infilco Division of Westinghouse Electric Corporation in Richmond, Virginia and is sold under the trademark "Accelator."

SUMMARY OF THE INVENTION

It is a primary object of this invention to provide an efficient and economical method for the removal of industrial wastes from liquid effluent. Prior to this invention, removal of wastes containing a high concentration of material and/or a high percentage of oxidizable organic material could not be successfully performed in either an efficient or economical manner. Large concentrations of either dissolved or suspended material tend to overwhelm and clog the apparatus unless very large, unwidely and expensive equipment was utilized.

In addition, large quantities of reactants are thereby consumed. This results in the production of secondary pollution caused by the reactant material.

The presence of large amounts of organic matter in the waste introduces another problem. As such material is generally nonionic, precipitation techniques are generally inefficient if standard inorganic precipitants are utilized. If the organic material is allowed to remain in the waste effluent and subsequently pass into an evaporating lagoon, river, etc., it can cause a relatively high biochemical oxygen demand (BOD) and chemical oxygen demand (COD) to build up in these bodies of water and the ground adjacent to them. As a result the effective oxygen concentration will be reduced, thereby preventing many beneficial organisms from surviving therein. Only certain anaerobic bacteria will flourish, thereby producing a "dead" body of water with an unpleasant odor. It is therefore a further object of this invention to provide a process for reduction of the BOD and COD in industrial plant effluents.

It is another object of this invention to provide apparatus suitable to carry out the novel processes of this invention. Further objects will become apparent from the detailed specification herein.

The method of the present invention broadly includes the sequential treatment of liquid industrial effluent with acidic and alkaline coagulants and cationic and anionic polyelectrolytes in a clarifier unit. Thus, liquid industrial effluent is treated by addition thereto of an acidic coagulant to lower the pH and to enhance the removal of starches and sugars. The addition of acidic coagulant may be performed just prior to or at the entry of the effluent to the clarifier unit; alternatively, the acidic coagulant may be added to the liquid effluent while the effluent is in a holding tank.

Once in the clarifier system, the effluent to which acidic coagulant has been added is treated by addition thereto of an alkaline substance to raise the pH, thereby causing a voluminous and heavy floc to form in the clarifier. Another acidic coagulant is then added to the effluent in the clarifier for lowering the pH and for additionally forming floc. Anionic and cationic polyelectrolytes may be added to the clarifier at this point to enhance the ability of the floc to remove colloidal materials. The heavy flocs and precipitates are removed from the bottom of the clarifier, while lighter flocs and precipitates are collected in a separate region. The remaining effluent, which is substantially free of waste materials can either be released to a suitable ground or surface receiving system or can be subjected to additional treatments such as additional clarifying, filtering, and oxidizing, followed by reverse osmosis and the like before release.

The invention entails a unique process for the removal of wastes from an industrial liquor wherein coagulating, flocculating and precipitating agents are admixed into said waste liquor at successive stages of treatment. As used herein the term floc will include any generally solid material which can be mechanically separated from the remainder of the effluent. These agents comprise ionic coagulants, and cationic and anionic polyelectrolytes. The stepwise addition of these reagents, while simultaneously adjusting the pH (acid or base) of the various treatment media, facilitates the formation of a voluminous and heavy floc to entrap suspended particles. The process of this invention also neutralizes and coagulates colloidal wastes through the mechanism of mutual precipitation and neutralisation of "zeta" potential while simultaneously precipitating any inorganic substances present in the liquor. The pH of the treatment medium is systematically varied from step to step, thereby enhancing the action and efficieny of the reactant materials. As the waste liquor is passed sequentially through the reaction chambers, the reactant materials are admixed in controlled quantities, generally quartering the quantities of materials utilized in each succeeding step. Thus, smaller quantities of reactants are necessary and more complete removal of wastes is effected than in prior processes. This process is particularly effective in treating wastes containing large quantities of oxidizable organic matter.

The invention also entails a novel cationic polyelectrolyte coagulating and flocculating agent.

In a preferred mode of practice of the present invention, liquid industrial effluent is treated with an cationic polymeric coagulant and a cationic polyelectrolyte in a holding tank or during transfer to the holding tank, and the subsequently treated effluent then passed to a clarifier for sequential chemical treatment and pH fluctuations as above-described.

The invention also provides means for performing the process. It comprises a novel combination of a holding tank, one or more clarifying tanks, and optionally an oxidizing chamber. The particular combination and sequence of reaction tanks facilitates a more complete separation of sludge materials from the waste liquor. The unique construction of the reaction chambers utilizes inner tanks and baffles permitting different mutually reactive reagents to be admixed into the same tank without a waste of material due to reagent-with-reagent reaction which would be wasteful and expensive. The apparatus of this invention is capable of high volume sludge separation while operating on a continuous basis.

The means and method of this invention are particularly applicable to the effluent from a cake baking plant. This effluent generally contains varying quantities of organic food-stuff, having an extremely high BOD and COD, as well as certain inorganic salts. These bakery wastes have been difficult to treat as their character varies timewise, depending on the particular baking process. These wastes contain high concentrations of starches, sugars, flavorings, shortenings, etc., as well as detergents, salt and leavening agents. It has not been possible before this invention to satisfactorily treat such waste materials by a single efficient and economical continuous process.

BRIEF DESCRIPTION OF THE DRAWINGS

FIG. 6 is a schematic diagram of the apparatus for carrying out the preferred method of the invention.

DETAILED DESCRIPTION OF THE INVENTION

All materials utilized in the process of this invention need only be of technical grade. Quantities greater than those described herein may of course, be added, but the addition of such quantities will not increase the efficieny of the method but will merely be economically wasteful of the reactant materials. Naturally great excesses of materials must be avoided or else one form of pollutant is merely replaced by another. Additionally, the addition of large excess of polymeric polyelectrolytes may render the treatment liquor too viscous.

Figure 1:
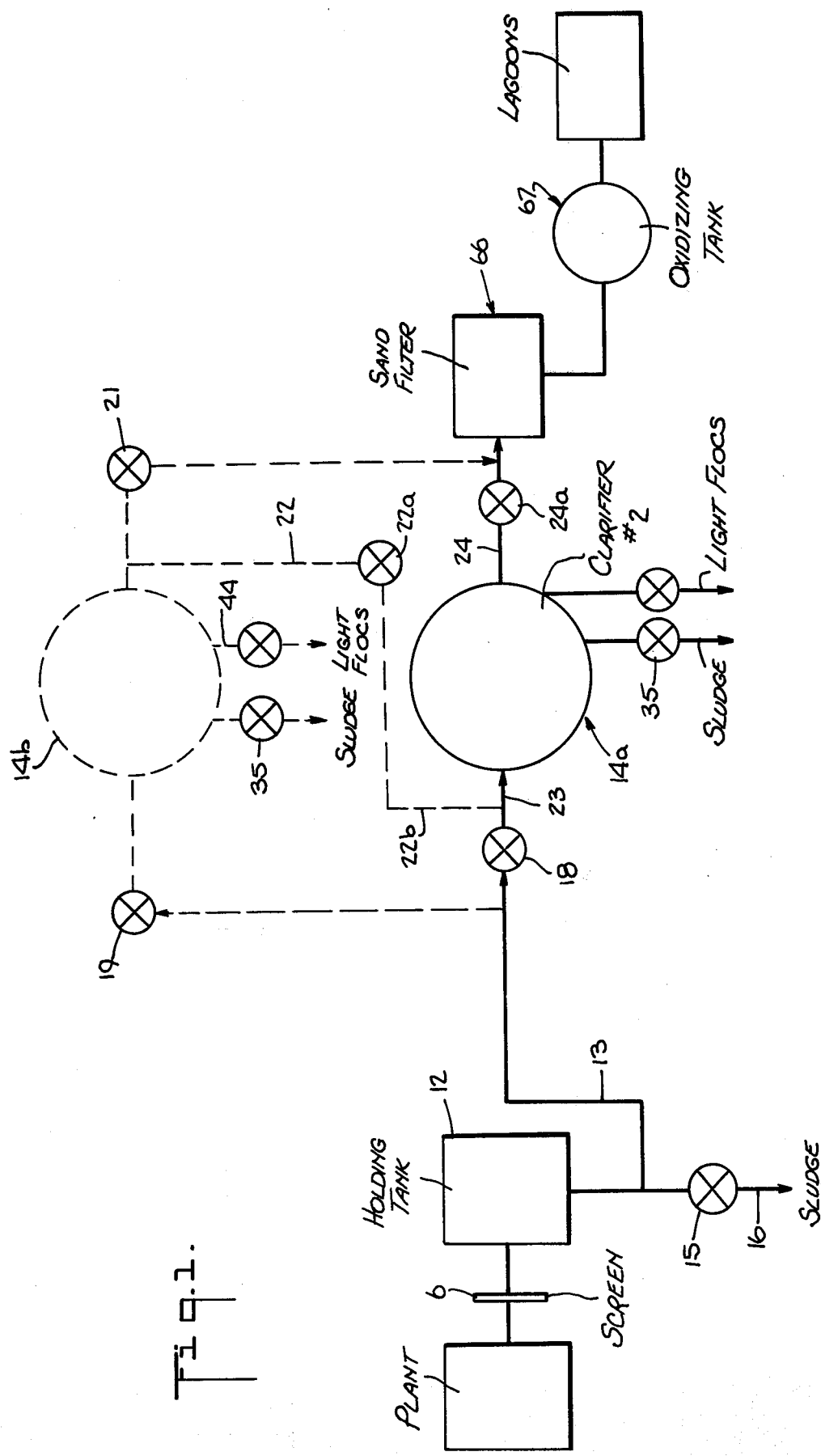
FIG. 1 is a schematic diagram of the apparatus for carrying out the method of the invention.
Figure 2:
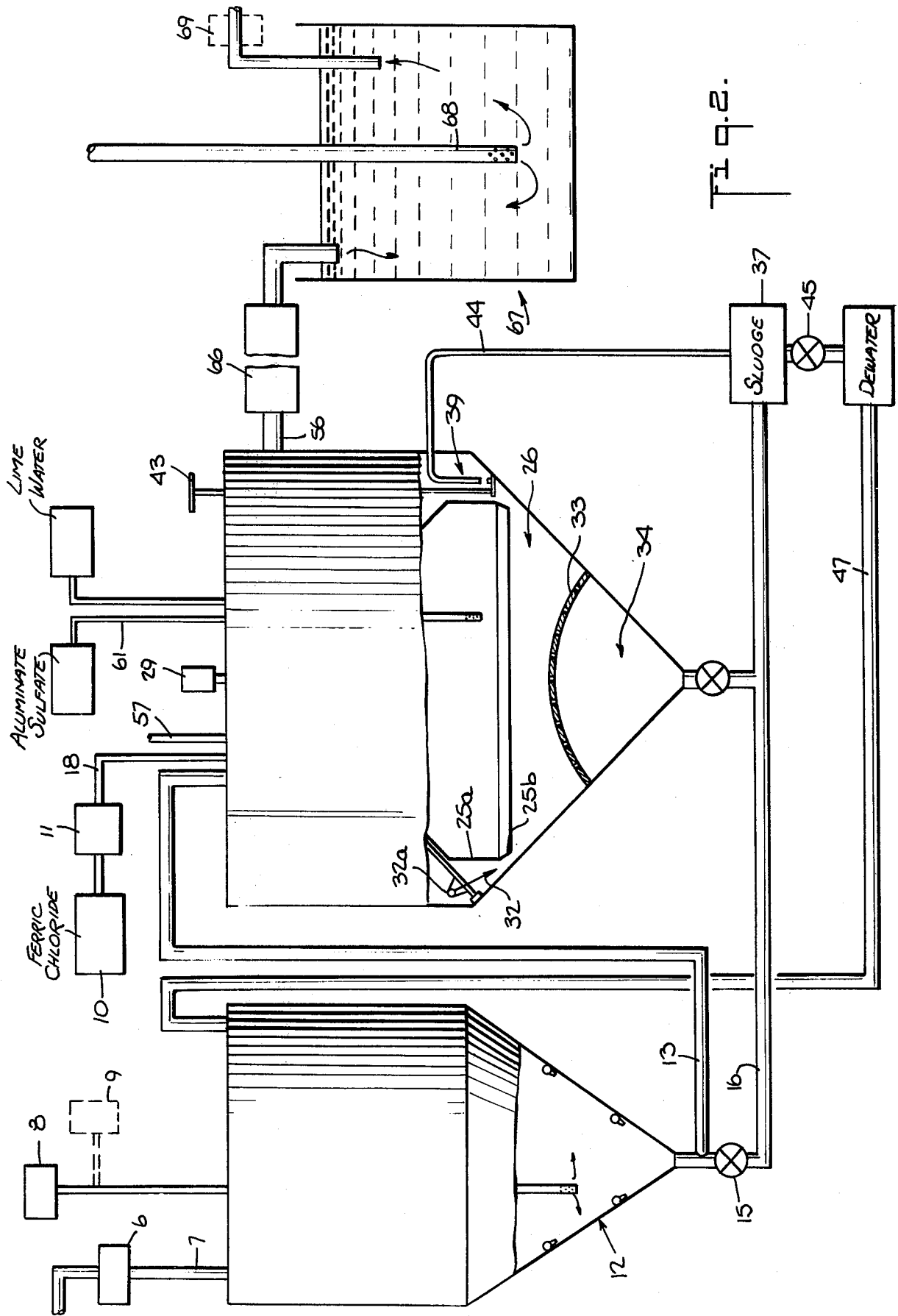
FIG. 2 is a vertical section of the apparatus of the invention and showing the main processing chambers of this invention.

Raw effluent from the industrial plant can be first passed through a coarse screen 6 as shown in FIGS. 1 and 2. This step will prevent large pieces of matter from passing into the treatment system, which, if allowed to pass unchecked could damage or clog the system. Examples of such matter could be paper, plastic bags, nuts, fruit rinds, etc.

As illustrated in FIG. 2, the screened waste liquor is then preferably treated with an agent to inhibit fermentation. The screened effluent is preferably treated while contained in the holding tank 12. However it may also be treated while passing through the terminous pipe 7, prior to passing into holding tank 12. A preferred anti-fermentation agent is chlorine. This step can be carried out by either directly passing chlorine gas into the liquid waste such as by use of gas diffusing apparatus 8, or by the addition of a chlorine generating compound, such as sodium or calcium hypochlorite, to the liquor. These compounds can be added by feed device 9. The addition of either is suitably metered to correspond to the flow of raw effluent from the plant. Generally, it will be more economical to utilize chlorine gas rather than a chlorine generating compound.

The chlorine concentration must be maintained at a sufficient level to inhibit fermentation of any carbohydrates which may be present in the waste liquor. If fermentation were to take place, various soluble organic compounds, such as aromatics and alcohols, could be produced which could not then be efficiently removed by the method of this invention. A concentration of about 20 ppm of chlorine is generally sufficient to suppress fermentation, but the concentration of chlorine may be varied up to about 25% above or below 20 ppm, depending on the nature of the particular waste material to be treated and the percentage of total solids in the waste liquor.

The effluent is then permitted to remain in the holding tank 12 for a predetermined period of time. As the inflow to the holding tank may be intermittent or continous, and the outflow is continuous, its size should be selected with the volume of flow in mind. It is desirable that the average time of retention of effluent in the holding tank be no more than about a day. However, the holding tank need not be kept full, and may be run at a lower level, thereby reducing the effective dwell time. In the absence of the addition of coagulant to the holding tank, it is important to keep dwell time relatively short in order to prevent extensive chemical and physical changes in the nature of the wastes. The holding tank should have excess capacity to handle emergency conditions such as interruption in the operation of equipment downstream thereof. In addition, partial filling in normal operation of a holding tank having excess capacity tends to insure equalization of the pH of the effluent therein.

Should the waste material stay in the holding tank for too long a period of time where no coagulant is to be added to the holding tank, certain of the suspended solids may dissolve, making them more difficult to remove. As in the example of cake baking plant waste, up to about 90% of the waste is in the form of suspended matter, and it is simpler to entrap this matter before it has been allowed to dissolve. There is also the possibility that some fermentation will take place, even in the presence of the chlorine, thereby rendering the material more difficult to remove. The treatment in the holding tank 12 serves generally to equalize the composition and pH of the plant waste as well as provide a reservoir for further treatment. If the effluent is more acidic than the aforementioned pH range, lime water can optionally be added to the effluent in the holding tank, thereby bringing the pH of the treatment medium to the desired range.

As described in detail hereinafter, a preferred embodiment of this invention utilizes the holding tank as a pretreatment vessel for removing large quantities of organic waste material from the industrial effluent prior to the treatment in the clarifier unit. In this embodiment, a polymeric cationic coagulant and a cationic polyelectrolyte are added to the liquid waste effluent just prior to entry into the holding tank or in the holding tank itself. The liquid effluent is permitted to remain in the holding tank during which the coagulants cause the formation of flocs which remove large amounts of suspended or dissolved wastes. Thus treated it is then passed to the clarifier unit where it is subjected to sequential chemical treatment and the attendant pH fluctuations for further clarification using greatly reduced amounts of chemical coagulants.

In one embodiment of this invention, the liquid, including any flocs or precipitates, is drawn off from the bottom of the holding tank 12 by means of suitable piping 13, and passed into one or more clarifying tanks 14. Valve 15 and pipe 16 enable the holding tank to be flushed.

Figure 3:
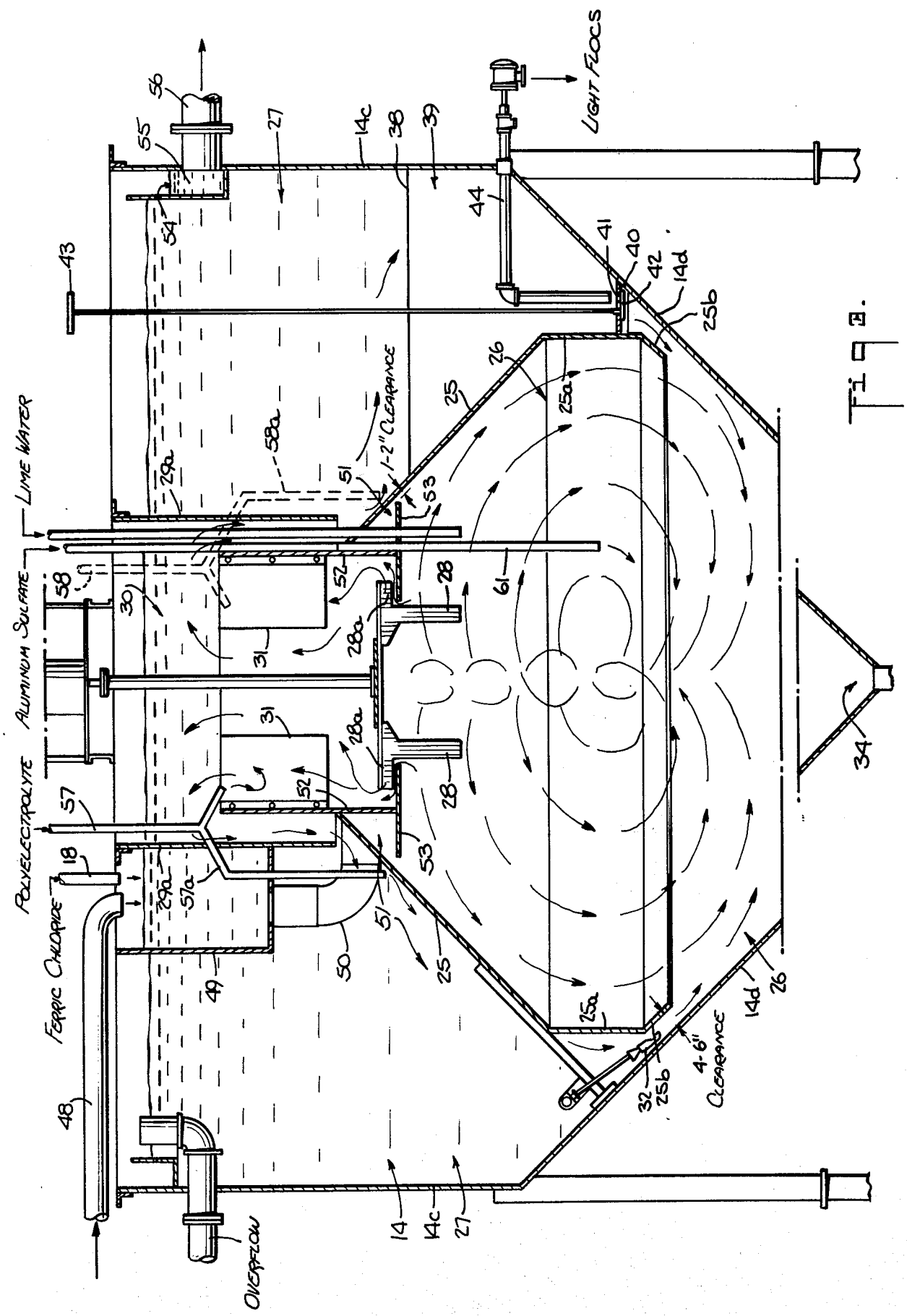
FIG. 3 is a vertical section drawing showing greater detail of the processing chamber which is a clarifier.

The waste liquor is admixed with a primary coagulant which produces positive metallic ions in the liquor. This material may be added to the effluent while the effluent is in holding tank 12, or even while the effluent is passing through terminous pipe 7. However, it is most convenient to add the primary coagulant to the effluent prior to or at the entrance to the clarifier, i.e., when the effluent is passing from pipe 48 into chamber 49 (FIG. 3).

The apparatus provided includes a container 10 for the coagulant and any suitable metering device 11.

Coagulation does not take place in chamber 49, but instead occurs in a subsequent step of the process.

A preferred material for the primary coagulant is ferric chloride, although there are numerous equivalent materials such as sulfuric acid, hydrochloric acid and the like. The ferric chloride, when dissolved in the waste liquor provides positively charged metallic ions which may react with negatively charged wastes, and negative ions which later increase floc formation. The coagulant is added in any convenient form and by any convenient method, but will more rapidly admix with the effluent if added as an aqueous solution. If ferric chloride is utilized, it has been found to be convenient and inexpensive to utilize a 42° Be (specific gravity of 1.4256) of industrial grade ferric chloride. This acidic solution is a by-product from steel pickling mills where hydrochloric acid acts on the iron. It will generally be sufficiently mixed into the chlorinated effluent by means of the turbulence of the liquid. The acidity is necessary for proper control of the pH.

The amount of primary coagulant to be added will, of course, vary with the specific nature and concentration of the waste material to be treated. If ferric chloride is utilized, the quantity added is controlled in proportion to the total concentration of both dissolved and suspended matter. It has been found that for the treatment of wastes from a cake baking plant, the addition of about 0.5 ml. to about 1.0 ml., and preferably about 0.5 ml. to about 0.75 ml., of the above-mentioned solution of ferric chloride per liter of effluent, to be preferable. The ferric chloride also aids the hydrolysis of the starches and sugars contained in the effluent to facilitate their later removal. The ferric chloride aids in breaking down the starches and sugars into water and simpler organic materials.

The pH of the effluent in pipe 48 or at the entrance to chamber 49 is generally in the range of about 9 to about 10.5. The addition of the ferric chloride will reduce the pH of the incoming waste material in clarifier 14 to the range of about 2.5 to about 3.5.

While a single clarifier may be used, it will greatly enhance the versatility of the system to utilize multiple clarifiers. The sizes and numbers of clarifiers will naturally depend on the volume of waste to be treated. A preferred embodiment as shown in FIG. 1 is to utilize at least two clarifiers 14a and 14b, which are arranged so as to be operable in either a serial or parallel manner. One of the clarifiers (14b) is preferably situated a few feet higher than the other. This allows for gravity feed during serial operation. Alternatively, the liquid may be pumped throughout the system.

The dual clarifier system shown in FIG. 1 allows the clarifiers to be used in series when treating a moderate volume of effluent containing large concentrations of waste materials. Parallel usage is designated for handling large volumes of effluent containing smaller concentrations of waste materials. Valves 18 and 19 are provided to properly route the waste liquors to either or both of the clarifiers. Provision for two clarifiers in this manner also allows for cleaning and repairing without requiring the complete shutdown of the treatment plant. Naturally, there is a somewhat greater removal of waste materials when using two clarifiers operated in series. Generally, a single clarifier will remove about 90% of the amount of wastes that two clarifiers in series would remove.

This arrangement of lines and valves enables either of clarifiers 14a and 14b to be used alone, to be used in parallel, or with clarifier 14b in series and upsteam of clarifier 14a. The outlet 20 of clarifier 14b is connected to valve 21. Outlet 20 is also connected by line 22, valve 22a and line 22b to inlet 23 of clarifier 14a. Outlet 24 of clarifier 14a is connected to valve 24a. For operation of a single clarifier valve 22a is closed and one of valves 18 or 19 is opened. To place clarifier 14b in series with clarifier 14a, valve 18 is closed, valve 19 is opened, valve 21 is closed, and valve 22a is opened. For parallel operation of both clarifiers, only valve 22a is closed.

The plant waste material from the holding tank is delivered by pipe 48 (FIGS. 2 and 3), to chamber 49 in which entrapped air, bubbles, foam, and the like are separated from the flow. This prevents the formation of air or gas pockets in the clarifier which could impede the mixing of the effluent and the reactants.

From chamber 49 the effluent is directed by pipe 50 to annular inlet manifold 51 formed by the lower portion of inner cylinder shell 52 and annular plate 53. From the manifold the effluent moves down between inner baffle 25 and the periphery of plate 53 into the primary mixing zone 26 of the clarifier.

As illustrated in FIG. 3, the clarifying tank 14 includes an outer cylindrical shell 14c and a conical portion 14d extending downwardly beneath the shell. The opaque baffle 25 which generally divides the chamber into the primary mixing zone 26 and the clarified waste zone 27. Baffle 25 is in the form of a truncated cone, converging in an upward direction. The lower portion of opaque baffle 25 is provided with a downwardly extending skirt 25a. Attached to the bottom edge of skirt 25a is flange 25b which forms an annular opening with respect to shell 14d. The width of the opening, by way of example can be about 4 to 6 inches. This opening exists only in that segment of the clarifier outside of plates 38, described below.

Figure 4:
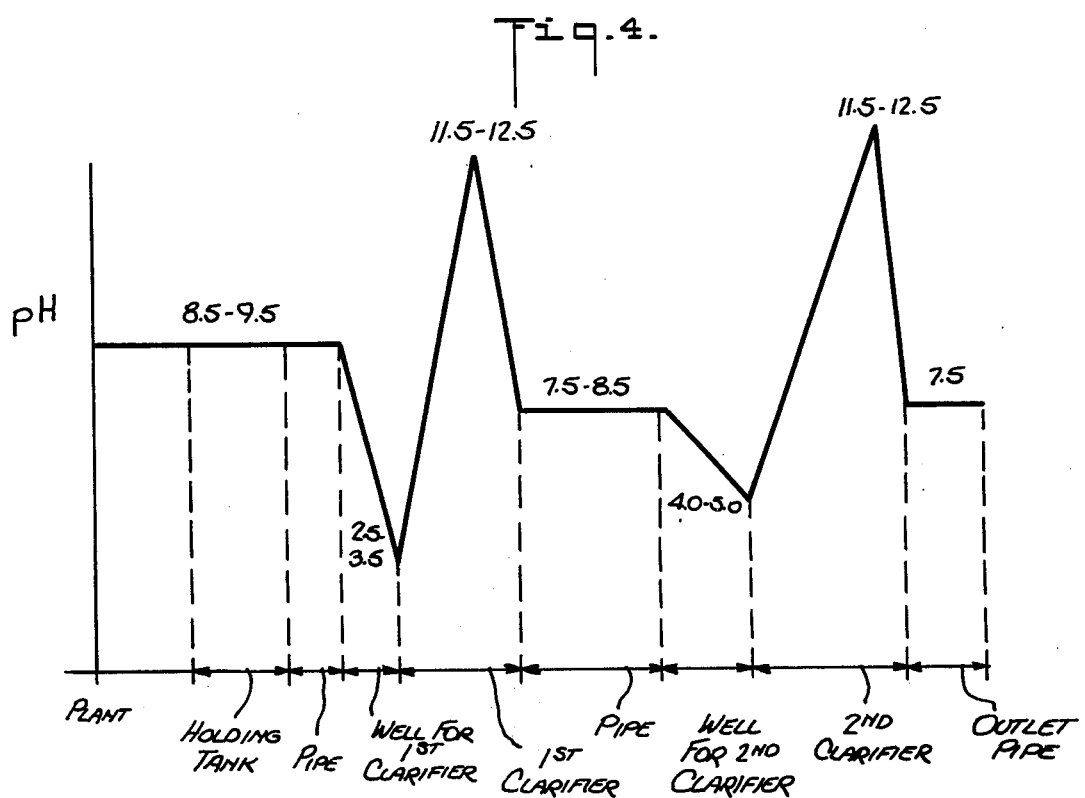
FIG. 4 is a plan view of the clarifier.

Within clarifier 14 there are provided plates 38 (FIGS. 3 and 4) which extend from baffle 25 to outer shell 14c and 14d. Plates 38 can be located to define a segment of approximately 90° within the periphery of the clarifier thereby forming one or more chambers 39 in which lighter flocs can be accumulated.

The bottom of chamber 39 between skirt 25a and cone 14d is closed by bottom wall 40 containing drain opening 41. Chamber 39 can be flushed by opening valve 42 which otherwise closes opening 41, thereby permitting any residue within the chamber to be flushed toward the bottom of the clarifier. Handle 43 enables an operator to manipulate valve 42.

The clarifier may be operated with valve 42 in either the open or closed positions. Generally, when treating effluent containing heavier materials, the valve should be left open to allow the heavier flocs formed to migrate towards the bottom of the clarifier. When lighter flocs are formed, valve 42 is preferably closed to entrap these lighter particles.

An impeller 28, and means 29 to rotate the impeller are mounted axially in the clarifier 14. The impeller 28 serves to distribute and mix the reactants and liquor and to facilitate the concentration of sludge at the bottom of the tank. The direction of flow which is caused by impeller 28 is shown in FIG. 3 by arrows. A generally cylindrical baffle 29a is mounted axially around the rotation means 29, around inner shell 52, and generally above the impeller 28 thereby together with inner shell 52 defining a secondary mixing zone 30. Baffle 29a should extend higher than inner shell 52. The pumping action of impeller 28 imparts a toroidal flow to the waste liquor within the primary mixing zone 26. Impeller 28 directs flow from the primary mixing zone upwardly between the impeller and plate 53 into secondary zone 30 defined by inner shell 52 and baffle 29a. Removable baffles 31 can direct the flow from impeller 28 upwardly within the secondary mixing zone 30.

As subsequently described, reactants are introduced into the primary mixing zone 26 to further the formation of flocs. In addition, the flow in the primary mixing zone in conjunction with perforated plate 33 separates heavy flocs which at which in part are the result of the introduction of coagulants prior to the clarifier 14.

The pumping action of the impeller in directing flow into secondary mixing zone 30 from the primary mixing zone 26, serves to maintain the desired direction of flow and to increase the mixing of the reactants with the flow. From the secondary mixing zone 30 the flow passes outwardly and in a downward direction between shell 52 and shell 29a, existing in the annular portion formed between shell 29a and baffle 25. The flow descending from shell 29a enters the upper section of zone 27 of the clarifier. A portion of flocs descend from this section into chamber 39 (FIGS. 3 and 4) for entrapment and subsequent removal. Flocs which descend to either side of chamber 39 can return to the primary chamber through the annular opening between flange 25b and shell 14d. The substantially clarified liquid within zone 27 flows upwardly toward perforated dam 54 which surrounds zone 27 and forms annular well 55 into which the clarified liquid can pass. By means of pipe 56 a flow of clarified liquid is removed from clarifier 14.

In the primary mixing zone of each clarifier the waste liquor receives the metered amounts of solutions of chemicals as the waste liquor is directed in an outward to inward direction with a continuous motion. Under these physical conditions, chemicals react with the dissolved and suspended solids resulting in abundant coagulation and flocculation. As the process proceeds the mass of waste liquor within the primary mixing zone becomes concentrated with heavier and heavier flocs. Centrifugal force resulting from the toroidal motion as well as the force of gravity causes the flocs to be urged toward the lower portion of the primary zone. Cone 14d directs the flocs downwardly parallel to its inner surface with the result that they slip to the bottom. At a calculated distance from the bottom of the cone a perforated convex or mushroomshaped plate 33 having holes therein which are quite smaller in diameter than that of the cone at that point is disposed to impede the whirling or eddy water currents produced by the blades of impeller 28 in order that the flocs may be deposited in the bottommost portion of the cone and be thereafter safeguarded from being disturbed. Thus, the size of the openings and the spacing therebetween is selected to enable heavy flocs to pass downwardly through the openings while the solid areas of the plate 33 deflect the circulating flow of waste liquor upwardly toward impeller 28. Heavy flocs which pass through openings 33a accumulate in sludge chamber 34. The plate 33 shields the heavy flocs from being withdrawn from the sludge chamber.

To facilitate the removal of sludge from the bottom of the clarifier there may be provided a plurality of water jets 32 (FIGS. 3 and 4) which can direct a spray of water at a number of locations along the inside of cone 14d toward the bottom thereof. The water jets are each connected to manifold 32d.

During operation, sludge is removed from sludge chamber 34 periodically as an accumulation occurs. The sludge is removed by opening valve 35 which releases the sludge through pipe 36 to tank 37. Lighter flocs are removed periodically from chamber 39 by means of pipe 44 which delivers the flocs to tank 37. The heavier and lighter flocs in tank 37 are released periodically by means of valve 45 to a de-watering device 46 such as a centrifuge.

Water removed by de-watering device 46 is returned by pipe 47 to hold tank 12 for recycling through the process of the invention. The solid waste material separated by de-watering device 46 is the final output material of the system and method of the invention. This material can be either simply treated as any other solid waste material for disposal or possibly be subjected to recycling procedure such as for the preparation of cattle feed, a combustion material, etc.

Appropriate chemical feed means are mounted above each clarifier so as to introduce reactants into the appropriate reaction zones. When the clarifiers are used in parallel manner, the quantities of reactant materials added should be the same in all clarifiers. If utilized in serial manner, each succeeding downstream clarifier should use about one-quarter the quantity of reactant utilzed in the previous tank. Hence, for example if the primary clarifying tank utilizes x mg of reactant material per liter of effluent; a secondary clarifier will utilize about x/4 mg of reactant per liter of effluent; a tertiary clarifier about x/16 mg per liter, etc.

As shown in FIG. 3 clarifier 14 is of the form of clarifier used in the process of the invention where a single clarifier, two or more clarifiers in parallel, or two or more clarifiers in series are used.

The solution of cationic and or polyelectrolyte material, if utilized, is delivered to the clarifier by pipe 57 which includes branch 57a leading to zone 27 and branch 57b leading to the secondary mixing zone 30. In the case where a single clarifier is used or in the case where a pair of clarifiers are operated in parallel pipe 57 delivers polyelectrolyte which is anionic. Where the clarifiers are operated in series, an additional pipe 58 is provided in the second clarifier for providing cationic electrolyte. As in the case of pipe 57, pipe 58 includes branches 58a and 58b which direct the polyelectrolyte material to both zone 27 and secondary reaction zone 30, respectively. Furthermore, each of branches 57a and 58a are positioned away from chamber 39 in order to prevent the polyelectrolyte material from being trapped therein and thereby prevented from reacting with the material in zone 27. As shown in FIG. 2 each of pipes 57 and 58 are provided with a metering device 59 and 60, respectively, for delivering the flow of the polyelectrolyte material in accordance with the process of the invention.

In the case where the clarifiers are operated in series such as shown in FIG. 1, the valves are arranged to cause clarifier 14b to be the first clarifier and clarifier 14a to be the second clarifier, downstream of the first. In this case a different polyelectrolyte is delivered to each of the clarifiers and, accordingly, only a single pipe system 57 or 58 and a single metering device 59 or 60, respectively, are required. It is preferable to add anionic polyelectrolyte material to the first clarifier and cationic polyelectrolyte material to the second clarifier.

A coagulant capable of forming positively charged metallic ions in solution in the waste liquor is added to the primary mixing zone 26 as a secondary coagulant. Metering device 62 (FIG. 2) controls the flow of the primary coagulant, for example, aluminum sulfate. As shown in FIG. 3 the aluminum sulfate is delivered by pipe 61 which terminates within zone 26. Pipe 63 (FIG. 3) delivers an alkaline material, preferably lime water to zone 26 adjacent to the upper portion thereof, that is adjacent to the flow from manifold 51. With this arrangement it can be seen that the flow of the primary coagulant and lime water are maintained displaced from one another when they are released into the primary mixing zone 26 and the incoming effluent is reacted with the lime water first. Metering device 62 (FIG. 2) controls the flow of lime water through pipe 63.

As can be seen in FIG. 3, the flow from each of pipes 61 and 63 enables the solutions to be delivered to the primary mixing zone 26 displaced from one another. The torodial flow within the chamber in response to the pumping action of impeller 28 insures that the solutions are distributed and mixed with the waste liquor within the primary zone. The flow of polyelectrolyte material from either of branches 57b and 58b is directed into the upwardly moving flow from impeller 28 which extends through inner shell 52. Again, the flow of waste liquor insures the distribution of polyelectrolyte material. The flow of polyelectrolyte material from branches 57a and 58a is introduced into the same flow of material after it is passed downwardly between inner shell 52 and outer shell 29a.

PROCESS UTILIZING A SINGLE CLARIFIER

The treatment materials to be added to a single clarifier system generally comprise a cationic polyelectrolyte, an anionic polyelectrolyte, lime water, and a coagulant which generates positively charged metallic ions.

The cationic polyelectrolyte may be any commercial material, such as a polymer, such as AMERFLOC 10 ® or HERCOFLOC ® 849 ® or 859 ®, sold for such purpose; however, it has been found that a unique composition comprising an aqueous solution of sodium silicate and ammonium sulfate may also be used for the coagulation process.

The preferred form of this composition is produced by,
(a) diluting 1000 grams of a 41° Be solution of sodium silicate with water to form 11.4 liters of solution;
(b) dissolving 190 grams of ammonium sulfate in 2860 ml. of water;
(c) adding the ammonium sulfate solution to the sodium silicate solution over a period of about two to three hours with constant stirring, and;
(d) diluting the mixture with water to form a final volume of 28.6 liters.

The final concentrations of the sodium silicate and ammonium sulfate materials can be varied by up to about 10% each; however, the effectiveness of the composition will be somewhat diminished.

The cationic polyelectrolyte should preferably be utilized in a quantity at least sufficient to generate the equivalent of about 0.25 ppm in the treatment medium. The amount used will depend somewhat on the condition of the effluent being treated. Greater quantities can be used; however an excess of cationic polyelectrolyte can lead to undesirable increases in viscosity.

An anionic polyelectrolyte is also added to the liquor. These are soluble polymeric materials which produce large flocs. Anionic polyelectrolytes are sold under a variety of trade names. For example, "Calgon WT-2900" anionic polyelectrolyte material sold by Calgon Corporation, and "Atlasep 3A3" anionic polyelectrtolyte, sold by Atlas Powder Company.

The required quantity of polyelectrolyte solution, either cationic or anionic, increases if the polyelectrolyte solution has been permitted to age. Thus, in using aged solutions, that is to say not recently dissolved, it may be necessary to utilize up to five times the indicated quantity when using a polyelectrolyte polymer solution which has been previously prepared and stored.

The polyelectrolytes serve as "bridges" among submicroscopic particles, hastening their flocculation.

It is necessary to raise the pH by the addition of a suitable basic material. While any convenient base will suffice, it has been found that calcium hydroxide solution (limewater) is both effective and inexpensive. Sufficient limewater should be added to obtain a final pH in the clarifier in the range of about 7.5 to about 8.5 in the treatment liquor.

The limewater is added to the primary mixing zone 26 and raises the pH to the range of about 11.5 to about 12.5 in the immediate neighborhood of the terminous of the addition pipe 63. This high pH, which is almost immediately lowered to the range of about 7.5 to about 8.5 by the aluminum sulfate, generates an immediate voluminous floc with the reactants. It also hastens the conversion of the gelatinous colloidal precipitates to larger and denser solid particles, which then are concentrated at the bottom of the clarifiers.

Aluminum sulfate is a preferred choice for the secondary coagulant. This substance will form a voluminous floc at approximate pH of the treatment liquid which is about 8.5 after the treatment with aluminum sulfate. This floc serves to entrap any remaining suspended waste which was not previously removed. In addition, the charge of this floc will neutralize the "zeta" potential of any colloidal material thereby permitting it to agglomerate more easily into larger particles.

The aluminum sulfate must be added in quantities sufficient to remove substantially all remaining waste materials from the treatment liquor. Depending on the amount of waste present, the amount of aluminum sulfate to be added should be in the range of about 100 to about 500 mg/liter of effluent, with the preferred quantity towards the lower end of the range.

At the outlet pipe 56 of the clarifier, the clarified water has a pH in the range of about 7.5 to about 8.5. This water can be further treated as discussed herein before released from the system or released as is into a suitable receiver.

PARALLEL CLARIFIER SYSTEM

In this system (FIG. 1) each clarifier is operated substantially in the same manner as a single clarifier. The difference is that the flow capability is multiplied.

SERIES CLARIFIER SYSTEM

In series operation clarifier 14b (FIG. 1) can be the first clarifier while clarifier 14a is the second clarifier. The operation of clarifier 14b is substantially the same as that of a single clarifier with the exception that as to the polyelectrolytes, only the anionic polyelectrolyte is used.

After the first clarifier and before the second clarifier, an additional portion of primary coagulant, similar to that previously added, for example ferric chloride, is delivered to the effluent. This may be admixed with the effluent while passing through outlet pipe 22 (FIG. 1), or into chamber 49 of the second clarifier. Ferric chloride is again the preferred coagulant. The quantity can be substantially one fourth of the amount added previously. The addition of the coagulant reduces the pH of the partially clarified water to the range of about 4.0 to about 5.0.

After the addition of the coagulant, the water is delivered to the second clarifier 14a. A basic material, such as limewater, is added to raise the pH to the range of about 11.5 to about 12.5 as in the first clarifier. About one-quarter of the amount of the limewater introduced into the first clarifier can suffice to the desired increase in pH in the second clarifier.

In the second clarifier, a cationic polyelectrolyte is added, as distinguished from the first clarifier in which the polyelectrolyte was anionic. The quantity of cationic polyelectrolyte utilized is preferably that required to generate a concentration in the treatment liquor of about one-fourth the concentration of anionic polyelectrolyte in the first clarifier. Thus, if a concentration of 0.25 ppm of anionic polyelectrolyte was introduced in the first clarifier, sufficient cationic polyelectrolyte should be added to the second clarifier to produce a concentration of about 0.06 ppm. In addition, aluminum sulfate is again added. The result is a reduction of the pH to the range of about 7.5 to about 8.5. Here again one-quarter of the quantity of aluminum sulfate added in the first clarifier can suffice.

The partially clarified effluent from the final clarifying tank is then passed through a sand filter 66 (FIG. 2) to remove any remaining floc particles. Periodically the sand can be cleaned by back-washing with the wash water thereafter being added to the holding tank.

The treated liquor may then optionally be passed into a contact oxidizing chamber 67 wherein it is allowed to react with an oxidizing material. For example ozone or chlorine may be supplied through a gas diffuser 68 (FIG. 2). While ozone has been found to be a preferable oxidizing gas, it may be necessary to utilize chlorine as the oxidant should local sanitary codes so require. This treatment oxidizes remaining oxidizable matter thereby removing residual BOD and/or COD.

The use of chlorine rather than ozone has the advantage that no additional filtering will be necessary. Filter 69 will be required when ozone is used. Ozone is a stronger oxidant than chlorine and therefore will kill certain microorganisms which chlorine cannot kill. In addition, ozone has the advantage of not producing additional pollutants in the water such as chlorophenols and chloramines which may be produced when using chlorine as the oxidant. It also bleaches the water to a crystal clear state.

Water treated by the foregoing process is sufficiently pure to be disposed of in storm sewers, rivers, municipal sewage systems, lagoons, or recycled to the plant.

Figure 5:
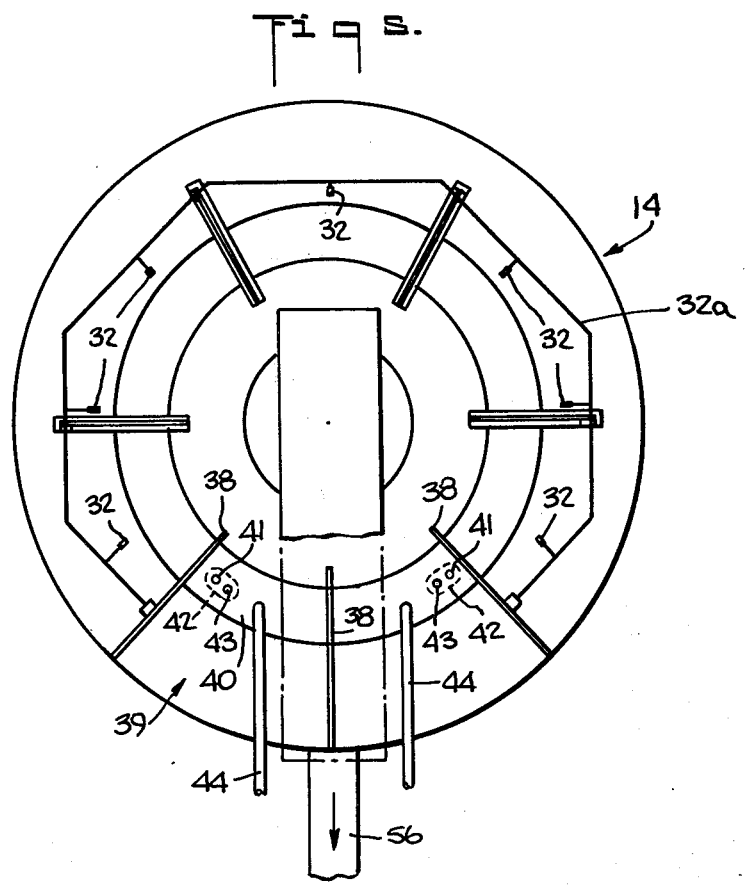
FIG. 5 is a graphical representation of the steps of the method of the invention and the cnages in pH related thereto.

As shown in FIG. 5, the system and method of the invention is carried out with a series of abrupt changes in the pH of the waste liquor being treated. In the diagram of FIG. 5 the waste liquor from the plant is indicated as having a pH of about 9.5. This would be a value which is typical of a cake baking plant and reflects the presence of detergents and related materials used in cleaning baking utensils, machinery and the plant itself.

In accordance with the invention the pH is abruptly reduced to the range of about 2.5 to about 3.5 upon the addition of the primary coagulant. This procedure inhibits the conversion of the constituents of the waste liquor into compounds such as alcohol which complicate the process of clarification.

Further, as shown in FIG. 5 when the waste liquor has been delivered to the first clarifier, the pH is abruptly increased in one region therein to a substantially high level, thereby promoting the production of flocs which enable solids as well as compounds entrained with the floc to be separated. This can be done by the addition of lime water.

In another region of the first clarifier, the pH is abruptly decreased. This procedure augments the action of flocs in separating solids and dissolved materials in the waste liquor. This can be accomplished by the addition to the first clarifier of aluminum sulfate.

Operation of the system of the invention has shown that the ultimate high and low cycling reversals of the pH of the waste liquor is most beneficial in the optimum production of flocs with the attendant separation of solids and dissolved materials. In the reduction of the pH in the first clarifier, the addition of anionic polyelectrolyte material promotes the linking together of the forming flocs.

As shown in the diagram of FIG. 5 material producing an ionic condition is added to the output of the first clarifier which has a pH in the range of about 7.5 to about 8.5 in order to again reduce the pH of the waste liquor, this time to the range of about 4.0 to about 5.0.

After lowering the pH, the pH is again increased in the second clarifier. This can be done again by the addition of lime water to the second clarifier. Consequently another abrupt increase in pH takes place to the range of about 11.5 to about 12.5.

In the final cycle of pH changes the pH is lowered. Aluminum sulfate can be added to abruptly reduce the pH to a level of approximately 7.5. In conjunction with this step, a cationic polyelectrolyte is added to aid in the linking together of the flocs.

Whether two clarifiers are used in series or a single clarifier is used, the cycling reversals of pH has been discovered to enhance the operation of the formation of flocs and thereby improve the clarification of the waste liquor. Thus a single clarifier would be subjected to three cycles of change in the pH, that is a decrease, an increase, and a final decrease to a level less than that of the waste liquor coming from the plant. Where two clarifiers are operated in series, an additional three cycles are applied, that is an additional decrease, increase and final decrease. Here again the final value of pH is less than that of the waste liquor from the plant.

A series of experiments were performed in order to compare the process of the present invention to various other types of treatment processes.

TEST PROCEDURE

For the process of the present invention, sampled plant effluent was (1) sequentially treated with ferric chloride to a pH of about 2.5, limewater to a pH of about 10.5 and aluminum sulfate to a pH of about 8.0 to 9.0, and the flocs formed in the treated effluent removed (Sample 1); and (2) treated in the same manner but replacing the acidic component with sulfuric acid and the basic component with ammonium hydroxide (Sample 2).

Variable samples were prepared, utilizing sulfuric acid as the acidic component and ammonium hydroxide as the basic component, by sequential treatment of plant effluent with base, acid and then additional acid (Cf. Albertson U.S. Pat. No. 3,423,309) (Sample 3); sequential addition of acid and base (Cf. Campbell U.S. Pat. No. 3,846,293) (Sample 4); and sequential addition of base and acid (Sample 5). In all such cases, any formed flocs were removed from the treated effluent.

The results of these analysis of the product effluents of these processes are shown in Table I.

Table I

| Constituents | Sample | | | | |
| --- | --- | --- | --- | --- | --- |
| | 1 | 2 | 3 | 4 | 5 |
| Biological Oxygen Demand (BOD) (mg/l) | 1550 | 1475 | 6625 | 6625 | 7750 |
| Chemical Oxygen Demand (COD) (mg/l) | 3470 | 2410 | 14846 | 14846 | 16966 |
| Turbidity (JTU) | 5.7 | 30 | 70 | 72 | 45 |
| Conductivity | 470 | 530 | 2650 | 2600 | 1600 |
| Nitrates (as $NO_3$) | 0.60 | 0.60 | 2.5 | 2.4 | 2.0 |
| Sulfates (as $SO_4$) | 26 | 51 | 910 | 820 | 260 |
| pH | 9.1 | 7.8 | 2.5 | 6.4 | 5.1 |

As can be seen from the foregoing results, the particular sequential treatment, and the consequent pH cycling, of the present invention achieves significantly greater clarification of industrial plant effluent.

PRETREATMENT SYSTEM

In a preferred embodiment of this invention, it has been found desirable to pretreat the liquid industrial effluent in the holding tank to remove a large portion of dissolved or suspended waste material before passing the effluent to the clarifier system as earlier described. In this embodiment, a cationic polymeric coagulant along with a cationic polyelectrolyte of the type described earlier, is used to treat the effluent in the holding tank. A preferred mode of operation is to add the coagulant and polyelectrolyte to the waste water while the latter is transferred from the plant source to the holding tank, and most preferably in a transfer tank where a portion of the plant effluent accumulates prior to passage to the holding tank.

Coagulation and flocculation of the dissolved or suspended wastes occurs in the holding tank with precipitation of flocs to the bottom of the tank. The flocs are permitted to accumulate to a predetermined degree after which they are pumped to an appropriate separatory device, typically a centrifuge. The thus dewatered waste sludge can be disposed of or treated for recovery of desirable organic materials. The centrifuge effluent, which is the industrial effluent from which a large degree of wastes have been removed, may then be recycled to the holding tank for further treatment with coagulant or, alternatively, passed directly to the clarifier system with the major portion of effluent in the holding tank.

The operation of the clarifier system upon the effluent which has been subjected to the above-described "pretreatment" with coagulant and polyelectrolyte generally corresponds to the operation as earlier described, i.e., sequential treatment of the effluent with primary acidic coagulant, alkaline material, and acidic secondary coagulant and the pH fluctuations attendant therewith; however, the pretreatment permits the utilization of greatly reduced amounts of these treatment materials in the clarifier (typically up to about a 90% reduction) and generally eliminates the need for the serial operation of more than one clarifier. Additionally, the pretreatment generally eliminates the need for using cationic polyelectrolyte coagulant aids in the clarifier. Most importantly, the resulting effluent from the clarifier is found to be greatly reduced in waste material.

Preferred among the cationic polymeric coagulants is AMERFLOC-10 ®, manufactured by the Drew Chemical Company. Preferred cationic polyelectrolytes are HERCOFLOC-849 ® or HERCOFLOC-859 ® manufactured by the Hercules Company.

An extremely important benefit of the preferred embodiment of this invention comprising the "pretreatment" is the significant reduction of chemicals needed in the clarifier system. Due to the increasingly stricter demands of federal, state and local agencies for low levels of waste material in industrial effluent, it is desirable, and indeed perhaps necessary, to supplement waste water treatment processes with additional ultrafiltration techniques such as reverse osmosis membrane units for treatment of effluent material emmanating from the clarifer; however, such sensitive ultra-fine filtration units are detrimentally affected by chemical complexes formed by the coagulant materials during the clarification operation. For example, compounds such as ferric hydroxide and calcium sulfate which form from the coaction of ferric chloride, lime, and aluminum sulfate in the clarifier, are found to clog the membrane filter units and thereby greatly reduce their efficiency.

In accordance with the preferred mode of operation described herein, the amounts of chemical coagulants used in the clarifier may be significantly reduced to the point where the formation of undesirable chemical complexes is greatly lessened. As a result, the utilization of ultrafiltration/osmosis techniques becomes a feasible method of post-treatment of clarified waste effluent.

The preferred embodiment of this invention comprising the "pretreatment" has been found particularly well-suited for the treatment of the bakery plant effluents early described, in that the coagulant/polyelectrolyte pretreatment has been found to effectively eliminate starches which are negatively changed and some of the fats from the waste water. Since starches and some of the fats may account for nearly 90% of such plant effluents, the "pretreatment" significantly reduces the removal loads (and hence the chemicals needed) in the clarifier.

The following is description of the preferred embodiment of this invention as it is practiced on a commercial bakery plant scale.

With reference to FIG. 6, plant effluent from a bakery plant, generated at the rate of approximately 175,000 gallons per day, is transferred from lifting station 99 via pipe 100 through hydroseive screen 101 to remove large-sized particles such as fruit rinds, nuts, paper, etc., to prevent these from passing into the treatment system. The screened effluent is then passed to a vibratory separator 102 (such as the type of separator manufactured by the Sweco Company) whereat any remaining relatively large sized matter is removed. The effluent then passes from the separatory apparatus by way of pipe 100 to transfer tank 103 having a capacity of approximately 2000 gallons. While passing through the transfer tank, the effluent has added thereto cationic polymeric coagulant (AMERFLOC-10) and cationic polyelectrolyte (HERCOFLOC-849) through lines 105 and 106, respectively. The coagulant is a liquid solution which is added at the rate of about 55 gallons per day, while the solid polyelectrolyte is added at the rate of about 3 kilograms per day. The effluent with these materials added thereto exits the transfer tank from pipe 107 and is delivered to holding tank 110.

The cationic coagulant has a high positive charge which, when introduced into the bakery waste water, coagulates and flocculates the starches which are negatively charged. As the starches coagulate and flocculate, the flocs collide with neighboring fats and sugars and other suspended molecules while the cationic polyelectrolyte, of a lesser negative change, binds the flocs together forming a large floc which then precipitates. In this manner, not only starches but also fats, sugars, glutens and the like are removed from the plant effluent.

Holding tank 110, where the aforementioned coagulation and flocculation occurs, has a capacity of about 250,000 gallons (40.0 feet in diameter; 32.5 feet high). The flocs precipitate to the conical bottom of the tank, carrying with them most of the fats, sugars and suspended solids. In due time the precipitates, almost all organic, become raw sludge which sludge pump 112 draws from the tank via line 111 for passage to dewatering centrifuge 113. Dewatered sludge from centrifuge 113 is removed for either disposal or other appropriate use, while centrate is recyled to holding tank 110 through pipe 114. At steady-state operation, the so-called waste bakery waters are pumped from the top level of holding tank 110 through line 115 to clarifier 120 operated as earlier described with the sequential addition of ferric chloride, lime and aluminum sulfate in amounts generally about 40–50% of quantities required in the absence of the pretreatment operation. Sludge removed from the effluent in clarifier 120 is removed by pump 121 to sludge tank 122 from where it is passed to a vacuum filter 123. Solid sludge is removed from the filter via line 124 while filtrate is drawn off via line 125 and recycled to holding tank 110 through pipe 114.

Clarified effluent from clarifier 120 is passed via line 127 to a second, serially-arranged clarifier 130 to which is optionally added ferric chloride, lime and aluminum sulfate. Sludge from clarifier 130 is removed via pump 121 for treatment in the same manner as sludge from clarifier 120. Clarified effluent from clarifier 130 is then passed through sand filter 131, chlorine contact chamber 132 and reverse osmosis unit 133 before being deposited in ponds 134.

What is claimed is:

1. A process for the continuous removal of wastes from industrial liquid effluent containing a high concentration of starches and sugars, by subjecting the effluent to a plurality of changes in the pH thereof, comprising the sequential steps of:
   (a) receiving liquid industrial effluent;
   (b) adding to the effluent an agent for inhibiting fermentation;
   (c) continuously flowing the effluent into a clarifier and adding to the flow of the effluent, material which includes a primary coagulant and which is acidic, for lowering the pH of the effluent to a value in the range of from about 2.5 to 3.5 and to aid in the hydrolysis of the starches and sugars;
   (d) inducing continuous circulation of the flow of effluent having lower pH in said clarifier, and immediately admixing into the effluent alkaline material to increase the pH of the effluent to a value in the range of from about 11.5 to about 12.5 and to enable the primary coagulant to form flocs therein, the flocs adapted to collect wastes from the effluent;
   (e) adding additional material which includes a secondary coagulant and which is acidic to the continuously circulating effluent in the clarifier having the increased pH for lowering the pH to a value in the range of from about 7.5 to about 8.5 and thereby forming additional flocs;
   (f) maintaining continuous circulation of the effluent in the clarifier for enhancing the development of flocs, the collection of wastes by the flocs, and the separation thereof from the effluent, and
   (g) separating the flocs and the wastes collected therefrom from the effluent,
   (h) discharging the clarifier effluent; and
   (i) discharging the separated flocs.

2. A process according to claim 1 wherein said agent for inhibiting fermentation is chlorine or a chlorine-containing compound.

3. A process according to claim 1 wherein said primary coagulant comprises ferric chloride.

4. A process according to claim 1 wherein said alkaline material comprises lime.

5. A process according to claim 1 wherein said secondary coagulant comprises aluminum sulfate.

6. A process according to claim 1 further comprising the step of introducing polyelectrolyte material into the effluent containing the alkaline material and the additional material, for augmenting further development of flocs.

7. A process according to claim 6 wherein the step of introducing polyelectrolyte material comprises the addition of at least one of an anionic and a cationic polyelectrolyte.

8. A process according to claim 1 further comprising the step of treating the discharged effluent with an oxidizing gas for oxidizing at least a portion of the remaining oxidizable waste material in the clarified effluent.

9. A process according to claim 1 further comprising biologically treating the discharged clarified effluent.

10. A process according to claim 1 wherein the discharged clarified remainder from step (h) is further treated by substantially repeating sequential steps (c), (d), (e), (f), (g) and (h), the materials of the repeated steps being of reduced amounts from those of the same steps initially in view of the reduced amount of wastes in the clarified discharge.

11. A process for the continuous removal of wastes from industrial liquid effluent containing a high concentration of starches and sugars, by subjecting the effluent to a plurality of changes in the pH thereof, comprising the sequential steps of:
   (a) receiving liquid industrial effluent;
   (b) adding to the effluent an agent for inhibiting fermentation;
   (c) continuously flowing the effluent into a clarifier and adding ferric chloride to the flow of the effluent material to lower the pH of the effluent to a value in the range of from about 2.5 to 3.5 and to aid in the hydrolysis of the starches and sugars;
   (d) inducing continuous circulation of the flow of effluent having lower pH in said clarifier, and admixing lime into the effluent to increase the pH of the effluent to a value in the range of from about 11.5 to about 12.5 and to form flocs therein, the flocs adapted to collect wastes from the effluent;
   (e) adding aluminum sulfate to the continuously circulating effluent in the clarifier having the increased pH for lowering the pH to a value in the range of from about 7.5 to about 8.5 and thereby forming additional flocs;
   (f) maintaining continuous circulation of the effluent in the clarifier for enhancing the development of flocs, the collection of wastes by the flocs, and the separation thereof from the effluent, and
   (g) separating the flocs and the wastes collected therefrom from the effluent,
   (h) discharging the clarified effluent; and
   (i) discharging the separated flocs.

12. A process for the continuous removal of wastes from industrial liquid effluent containing a high concentration of starches and sugars, by subjecting the effluent to a plurality of changes in the pH thereof, comprising the sequential steps of:
   (a) receiving liquid industrial effluent;
   (b) adding to the effluent an agent for inhibiting fermentation;
   (c) continuously flowing the effluent into a clarifier and adding ferric chloride to the flow of the effluent material to lower the pH of the effluent to about 2.5 and to aid in the hydrolysis of the starches and sugars;

(d) inducing continuous circulation of the flow of effluent having lower pH in said clarifier, and admixing lime into the effluent to increase the pH of the effluent to about 12.5 and to form flocs therein, the flocs adapted to collect wastes from the effluent;

(e) adding aluminum sulfate to the continuously circulating effluent in the clarifier having the increased pH for lowering the pH to about 7.8 thereby forming additional flocs;

(f) maintaining continuous circulation of the effluent in the clarifier for enhancing the development of flocs, the collection of wastes by the flocs, and the separation thereof from the effluent, and (g) separating the flocs and the wastes collected therewith from the effluent;

(h) discharging the clarified effluent; and (i) discharging the separated flocs.

13. A process for the removal of wastes from an industrial liquid effluent comprised of a high concentration of starches and sugars comprising the sequential steps of:

(a) pre-treating said effluent by:
  (i) adding to a continuous flow of said effluent a cationic polymeric coagulant and a cationic polyelectrolyte;
  (ii) inducing circulation of said effluent to enable said coagulant and polyelectrolyte to coagulate and flocculate waste materials in said effluent;
  (iii) removing said coagulated and flocculated wastes from said effluent;

(b) clarifying said pre-treated effluent by the sequential steps of:
  (i) continuously flowing said effluent into a clarifier and adding to the flow thereof material which includes a primary coagulant and which is acidic to lower the pH of the effluent to a value in the range of from about 2.5 to about 3.5 and to aid in the hydrolysis of the starches and sugars;
  (ii) inducing continuous circulation of the flow of effluent having lower pH in said clarifier and immediately admixing therewith an alkaline material to increase the pH to a value in the range of from about 11.5 to about 12.5 and to enable the primary coagulant to form flocs therein adapted to collect additional wastes from said effluent;
  (iii) adding to the continuously circulating effluent in said clarifier an additional material which includes a secondary coagulant and which is acidic to lower its pH to a value in the range of from about 7.5 to about 8.5 and for forming additional flocs;
  (iv) adding to said effluent in the clarifier an anionic polyelectrolyte;
  (v) maintaining continuous circulation of the effluent in the clarifier for enhancing the development of flocs, the collection of wastes by the flocs, and the separation thereof from the effluent;

(c) separating the flocs, and the wastes collected therewith, from the effluent to clarify the remainder of the effluent;

(d) discharging the clarified remainder of the effluent.

14. A process for the removal of wastes from an industrial liquid effluent comprised of a high concentration of starches and sugars comprising the sequential steps of:

(a) pre-treating said effluent by:
  (i) adding to a continuous flow of said effluent a cationic polymeric coagulant and a cationic polyelectrolyte;
  (ii) inducing circulation of said effluent to enable said coagulant and polyelectrolyte to coagulate and flocculate waste materials in said effluent;
  (iii) removing said coagulated and flocculated wastes from said effluent;

(b) clarifying said pre-treated effluent by the sequential steps of:
  (i) continuously flowing said effluent into a clarifier and adding ferric chloride to the flow thereof to lower the pH of the effluent to a value in the range of from about 2.5 to about 3.5 and to aid in the hydrolysis of the starches and sugars;
  (ii) inducing continuous circulation of the flow of effluent having lower pH in said clarifier and immediately admixing lime therewith to increase the pH to a value in the range of from about 11.5 to about 12.5 and to enable the primary coagulant to form flocs therein adapted to collect additional wastes from said effluent;
  (iii) adding aluminum sulfate to the continuously circulating effluent in the clarifier to lower its pH to a value in the range of from about 7.5 to about 8.5 and for forming additional flocs;
  (iv) adding an anionic polyelectrolyte to said effluent in the clarifier;
  (v) maintaining continuous circulation of the effluent in the clarifier for enhancing the development of flocs, the collection of wastes by the flocs, and the separation thereof from the effluent;

(c) separating the flocs, and the wastes collected therewith, from the effluent to clarify the remainder of the effluent;

(d) discharging the clarified remainder of the effluent.

15. A process for the removal of wastes from an industrial liquid effluent comprised of a high concentration of starches and sugars comprising the sequential steps of:

(a) pre-treating said effluent by:
  (i) adding to a continuous flow of said effluent a cationic polymeric coagulant and a cationic polyelectrolyte;
  (ii) inducing circulation of said effluent to enable said coagulant and polyelectrolyte to coagulate and flocculate waste materials in said effluent;
  (iii) removing said coagulated and flocculated wastes from said effluent;

(b) clarifying said pre-treated effluent by the sequential steps of:
  (i) continuously flowing said effluent into a clarifier and adding ferric chloride to the flow thereof to lower the pH of the effluent to about 2.5 and to aid in the hydrolysis of the starches and sugars;
  (ii) inducing continuous circulation of the flow of effluent having lower pH in said clarifier and immediately admixing lime therewith to increase the pH to about 12.5 and to enable the primary coagulant to form flocs therein adapted to collect additional wastes from said effluent;
  (iii) adding aluminum sulfate to the continuously circulating effluent in the clarifier to lower its pH to about 7.8 and for forming additional flocs;

(iv) adding an anionic polyelectrolyte to said effluent in the clarifier;

(v) maintaining continuous circulation of the effluent in the clarifier for enhancing the development of flocs, the collection of wastes by the flocs, and the separation thereof from the effluent;

(c) separating the flocs, and the wastes collected therewith, from the effluent to clarify the remainder of the effluent;

(d) discharging the clarified remainder of the effluent.

* * * * *

UNITED STATES PATENT AND TRADEMARK OFFICE
CERTIFICATE OF CORRECTION

PATENT NO. : 4,173,532

DATED : November 6, 1979

INVENTOR(S) : Hagop Keoteklian

It is certified that error appears in the above-identified patent and that said Letters Patent are hereby corrected as shown below:

Col. 1, line 52: change "threby" to -- thereby --;

Col. 1, line 62: change first occurrence of "of" to -- on --;

Col. 4, line 15: change "floculating" to -- flocculating --;

Col. 4, line 17: change "an" to -- a --;

Col. 4, line 60: change "cnages" to -- changes --;

Col. 5, line 2: change "efficieny" to -- efficiency --;

Col. 5, lines 47-48: change "continous" to -- continuous --;

Col. 7, line 33: change "designated" to -- designed --;

Col. 8, line 57: change second occurrence of "which" to -- least --;

Col. 9, line 16: change "floculation" to -- flocculation --;

Col. 9, line 30: change "bottomost" to -- bottommost --;

Col. 10, line 3: change "utilzed" to -- utilized --;

Col. 11, lines 46-47: change "polyelectrtolyte" to -- polyelectrolyte --;

UNITED STATES PATENT AND TRADEMARK OFFICE
CERTIFICATE OF CORRECTION

PATENT NO. : 4,173,532

DATED : November 6, 1979

INVENTOR(S) : Hagop Keoteklian

It is certified that error appears in the above-identified patent and that said Letters Patent are hereby corrected as shown below:

Col. 15, line 65: change "emmanating" to -- emanating --;

Col. 17, line 4: change "called" to -- treated --.

Signed and Sealed this

Twenty-fifth Day of March 1980

[SEAL]

Attest:

SIDNEY A. DIAMOND

Attesting Officer

Commissioner of Patents and Trademarks